Figure 1:
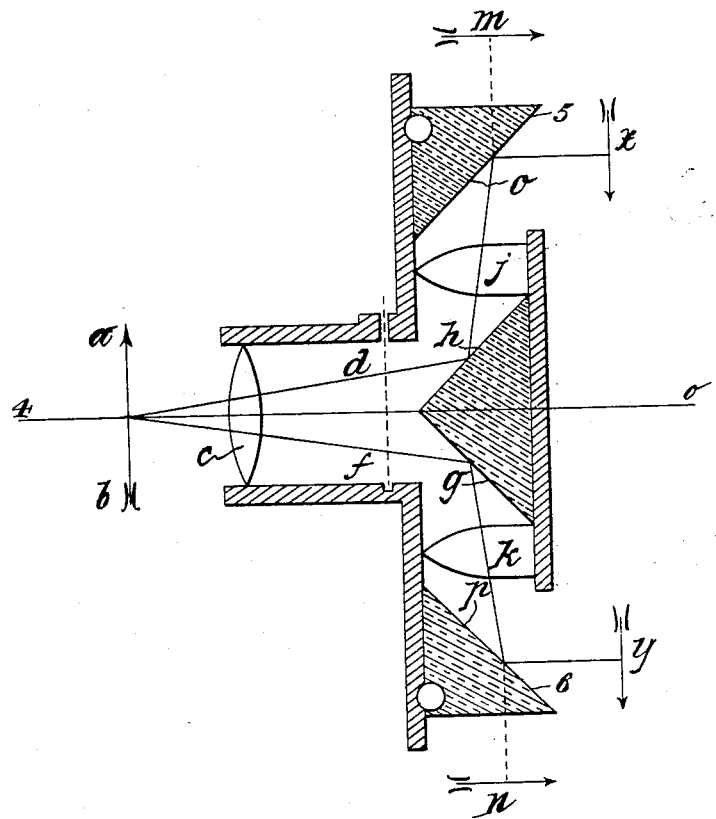

No. 733,090. PATENTED JULY 7, 1903.
J. SZCZEPANIK.
OPTICAL PROJECTION APPARATUS.
APPLICATION FILED MAR. 19, 1900.
NO MODEL. 3 SHEETS—SHEET 1.

No. 733,090. PATENTED JULY 7, 1903.
J. SZCZEPANIK.
OPTICAL PROJECTION APPARATUS.
APPLICATION FILED MAR. 19, 1900.
NO MODEL. 3 SHEETS—SHEET 2.
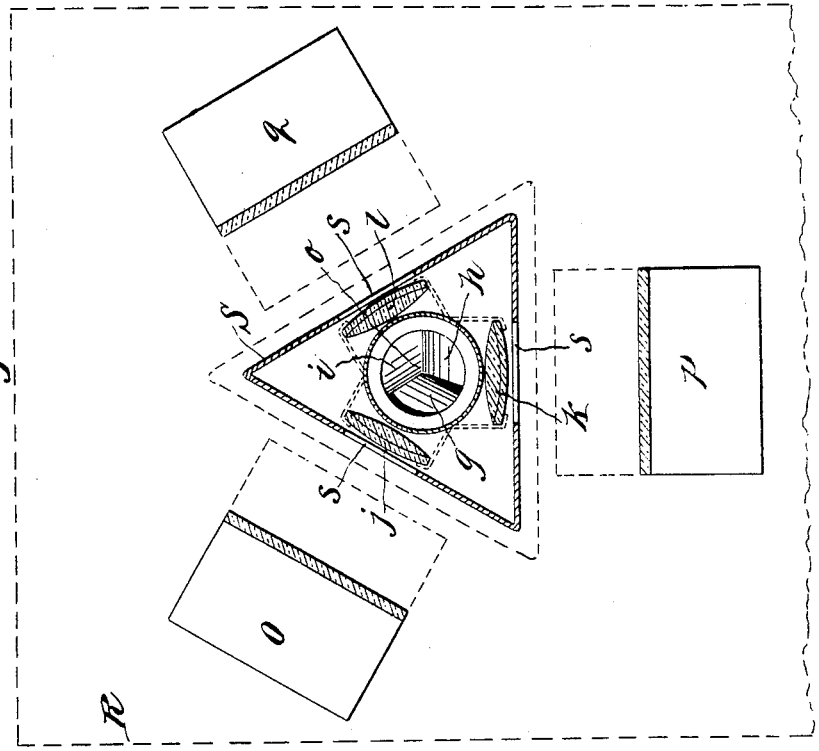
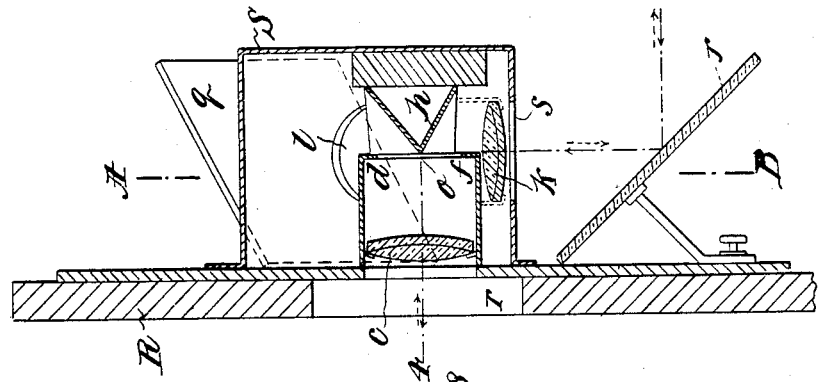
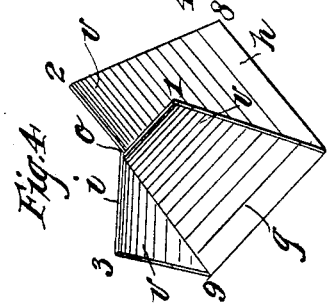
Witnesses:
Inventor
Jan Szczepanik
by [signature]
Atty.

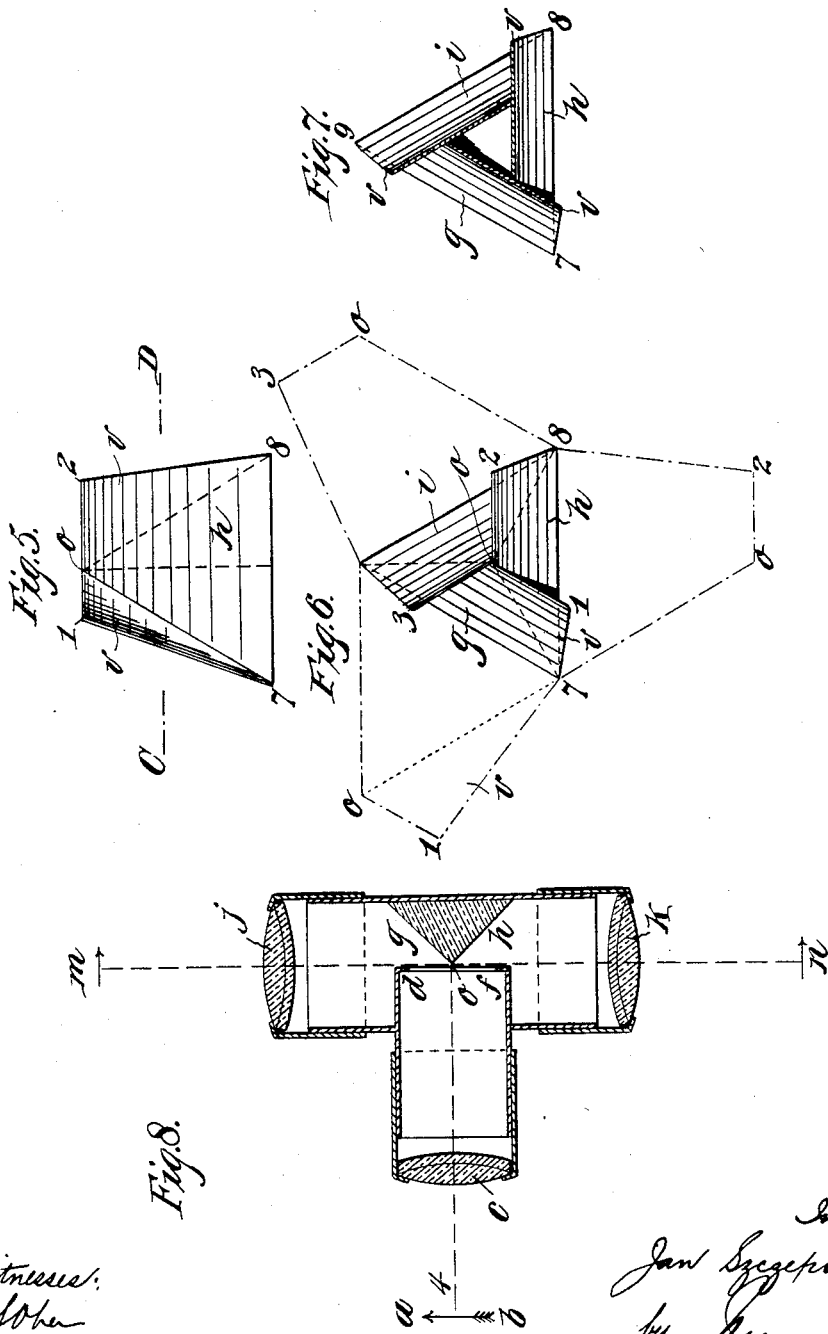

No. 733,090. Patented July 7, 1903.

UNITED STATES PATENT OFFICE.

JAN SZCZEPANIK, OF VIENNA, AUSTRIA-HUNGARY, ASSIGNOR TO SOCIÉTÉ DES INVENTIONS, JAN SZCZEPANIK & CIE., OF VIENNA, AUSTRIA-HUNGARY, A FIRM.

OPTICAL PROJECTION APPARATUS.

SPECIFICATION forming part of Letters Patent No. 733,090, dated July 7, 1903.

Application filed March 19, 1900. Serial No. 9,328. (No model.)

*To all whom it may concern:*

Be it known that I, JAN SZCZEPANIK, a subject of the Emperor of Austria-Hungary, residing at Vienna, in the Province of Lower Austria, in the Empire of Austria-Hungary, have invented certain new and useful Improvements in Optical Projection Apparatus; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to apparatus for taking a number of negatives of the same object, either simultaneously or not, as desired, in order to make positives of different value, and when these positives are placed in suitable relative positions and primary-colored lights passed through them the projected image of such positives will be accurately superposed on a suitable screen to form a sharp well-defined picture in natural colors.

Other features and applications of the device will be fully explained in the following description.

The principle involved consists in dividing the light collected by an objective lens into a number of parts and taking a photograph with the light of each part suitably modified, if desired, developing each plate, forming a positive, uniting the colored projections of the positives from sources of light near each positive and before these colored lights reach the common projecting lens—in other words, reversing the order of procedure for taking the negatives.

Referring to the drawings, in which like parts are similarly designated, Figure 1 shows in section an apparatus for making two pictures simultaneously from the same object, the images being reflected into a common plane. Fig. 2 is a section of a similar device for simultaneously taking and projecting three pictures. Fig. 3 is a section on line A B of Fig. 2. Fig. 4 is a perspective view, Fig. 5 a side elevation, and Fig. 6 a plan view, showing the development in dotted lines of the reflector. Fig. 7 is a section on line C D of Fig. 5, and Fig. 8 is a section of a device similar to Fig. 1 when the images are reflected in parallel planes.

In the following description the words "lens" and "objective" are to be understood to include all those forms of devices known as "lenses," whether they be single lenses or combinations of single lenses organized to act as a unit.

Referring to Figs. 1 and 8, $a\ b$ represent the object; $c$, the lens, suitably mounted in its cell; $d\ f$, the diaphragm position; $o$, the point of union of the two reflecting-surfaces or dividing-mirrors $g$ and $h$ and located in the optical axis $4\ o$. The reflecting-surfaces may be mirrors or prisms, as desired. $j\ k$ are lenses organized to be focused on sensitive media located in the picture planes that will be located opposite to one another, as shown at $m$ and $n$. However, if it be desirable to project both images in the same plane it will then be necessary to reflect them a second time by means of reflecting-mirrors 5 6, Fig. 1, the two images being indicated then at $x$ and $y$. It is obvious that by reason of the equal inclination of the reflectors $g$ and $h$ to the optical axis and the two substantially equal lenses $j\ k$ the images at $m$ and $n$ will be of the same intensity, and if these two images are reflected into a common plane by mirrors equally inclined to the optical axis these images will also be of equal intensity. The advantages of such a construction are obvious. Two pictures can be obtained simultaneously of the same object. Color-screens can be placed before each plate to produce negatives differing in color value. From these negatives positives can be made and placed in the proper position, either behind or in front of the color-screens, light passed through the negatives and screens to the dividing-mirrors, from which the rays are reflected and united before reaching and being condensed by the lens common to said dividing-mirrors. In the taking of the negatives there is a single source of light $a\ b$, say, of unit intensity, a certain quantity of which passes through the lens and is separated into two parts by the mirrors or reflecting-surfaces $g\ h$, which by reflection and refraction (leaving aside the effect of color-screens) is greatly diminished in intensity, so that it will require a somewhat longer exposure when making two pictures with this apparatus than in making a single picture by means of the lens c alone. Now when the apparatus is used for projection there are two sources of light, one behind each diapositive, of, say, equal intensity, usually much greater than the light which acted on the negative, and these two are combined before they reach the projection-lens, which condenses the light and distributes it again over the screen, producing a very sharp well-defined picture which when color-screens are used can be in two colors. A further advantage is found in ordinary photography for focusing cameras where ordinary finders do not enable the photographer to tell whether the picture is in focus or whether a moving object is in the desired position on the plate. This is easily accomplished by placing the plate-holder in the picture plane of one of the images and a ground glass in the other and focusing on the ground glass, a bulb-operated shutter being fitted to the lens opposite the plate. When the object moves across the field and is in about the desired position on the ground glass, the instantaneous exposure is made. Furthermore, two exposures can be made on different plates with different-sized stops, insuring exactly the same illumination of the object.

In case illumination from the surface of the object is necessary, as the interior of the eye, one half of the system is used for illumination and the other half for photographing, the source of light being placed, say, at $m$, the plate at $n$, and the object at $a\,b$, Fig. 8. If the eye be placed at or about the position of the object $a\,b$, the source of light at $m$, and the sensitized plate opposite the lens $k$, then the light at $m$ will be focused on the mirror or prism face $h$, be reflected through the upper part of the lens $c$, and focused in the eye, while the lower part of lens $c$ will focus the image of the illuminated portion on the mirror or prism face $g$, which latter reflects it through the lens $k$ to be focused on the sensitized plate opposite at $n$.

In order to make three negatives simultaneously taken through primary-color screens and to reproduce pictures in natural colors, the apparatus shown in Figs. 2 and 7 is shown as an example. The camera-front R has an opening $r$, in which is mounted the main lens or objective $c$ in a suitable cell, $d\,f$ being the diaphragm-opening, and behind this opening is located three dividing mirrors or reflectors $g\,h\,i$, symmetrically arranged with respect to the optical axis $o\,4$. Opposite each of the three mirrors is a lens $j\,k\,l$ and openings $s$ in a casing S, that surrounds the lenses and the reflectors, and opposite each lens is a reflector $O\,p\,q$, from each of which an image is reflected to a plate located behind its proper color-screen. (Not shown.) The dividing mirrors or reflectors $g\,h\,i$ are trapezoidal mirrors, each having an inclined edge running from the optical axis to the triangular base—that is, they are arranged like the faces of a tetrahedron and here shown as a regular tetrahedron, each side of which is extended at one edge by a portion $r$, so that the form of each side will be a trapezium or trapezoid. Thus a regular tetrahedron is composed of four equal triangular faces, and Fig. 6 shows the developed surface in dotted lines, where 7 8 9 represent the triangular base, and 7 $o$ 9 one of the triangular sides extended by the portion 7 $o$ 1, so that the three sides when placed together will appear in plan as shown in full lines in said Fig. 6. Fig. 7 shows a top plan view of the figure truncated on the line C D of Fig. 5. The upper edges of the dividing-mirrors $o'\,o^2\,o^3$ will divide the light coming through the diaphragm-opening $d\,f$ into three equal parts.

It is not deemed necessary to show shutter arrangements, color-screens, or plates, as these are details of construction well known in camera-making and can be arranged in any desired manner.

In using this apparatus for projecting pictures three colored pictures are united, and the optical axes of the auxiliary lenses $j\,k\,l$ are reflected so as to unite into a common axis $o\,4$, thus producing a remarkably sharp and well-defined colored picture in which the superposition seems perfect. Variations of exposure when color-screens are used, may be made by suitable stops located at the opening $s$ in the casing S.

I do not limit myself to the taking of two or three pictures simultaneously, as any number can be taken by suitably dividing the light passing through the lens $c$ by means of pyramidally-arranged dividing-mirrors with extended sides, and it is obvious that instead of using a pyramid having three sides, as shown in Figs. 4 to 6, I can use such having more than three sides and constructed in a manner similar to that described in relation to Figs. 4 to 7.

By means of this apparatus it is also possible by using a suitable shutter properly timed to project successively from a number of kinematographic plates or films several images one after another, the changing of the several plates taking place after all the plates have been illuminated, thus avoiding the movement of the films bringing the successive pictures into view and avoiding the usual blurring of the picture due to the movement of the films in kinematographs.

Having thus described my invention, what I claim as new therein, and desire to secure by Letters Patent, is—

1. In an optical instrument, the combination with a lens, of a plurality of dividing-mirrors organized to form a solid figure whose axis is in the optical axis of the lens, and an auxiliary lens opposite each mirror, substantially as set forth.

2. In an optical instrument, the combination with a lens, of a plurality of reflectors organized to divide the light coming from said lens into equal parts, an auxiliary lens organized to focus the light reflected from each reflector, substantially as and for the purpose set forth.

3. In an optical instrument, the combination with an objective lens, of a plurality of auxiliary lenses and an equal number of mirrors organized to deflect rays through all the optical axes of the auxiliary lenses into the optical axis of the objective and vice versa, substantially as and for the purpose set forth.

4. In an optical instrument, the combination with an objective, a plurality of auxiliary lenses and an equal number of mirrors, said mirrors organized to reflect rays in the optical axes of the objective, means for focusing the auxiliary lenses, a source of light near one of the auxiliary lenses whereby light is deflected through the objective to the object and the image defined by the remaining auxiliary lenses, substantially as and for the purpose set forth.

5. In an optical instrument, the combination with an objective, of a plurality of auxiliary lenses, an equal number of reflectors arranged to divide the light from the objective into as many parts as there are auxiliary lenses and to reflect said light through the respective auxiliary lenses, and an auxiliary reflector for each auxiliary lens, whereby all the images may be reflected into substantially the same plane, substantially as set forth.

6. In an optical instrument, the combination with an objective, of a plurality of auxiliary lenses, a faceted reflector arranged symmetrically to the optical axis of the objective and to deflect an image from each face through an auxiliary lens, means for reflecting all the images from said lenses to sensitized media, and means for focusing the auxiliary lenses, substantially as set forth.

7. In an optical instrument, the combination with an objective, of a plurality of auxiliary lenses, a faceted reflector arranged to deflect light through each of the auxiliary lenses to produce images of equal intensity, stops controlling the auxiliary lenses and means for focusing the latter, substantially as and for the purpose set forth.

8. A projection apparatus comprising a collecting-lens, means for deflecting the light from a plurality of simultaneously-lighted lantern-slides into a common field of light, all the images superposed before passing through the collector, substantially as and for the purpose set forth.

In testimony that I claim the foregoing as my invention I have signed my name in presence of two subscribing witnesses.

JAN SZCZEPANIK.

Witnesses:
ALVESTO P. HOGUE,
AUGUST FUGGER.